(No Model.)
T. MAXON.
DISK HARROW.
No. 494,785. Patented Apr. 4, 1893.
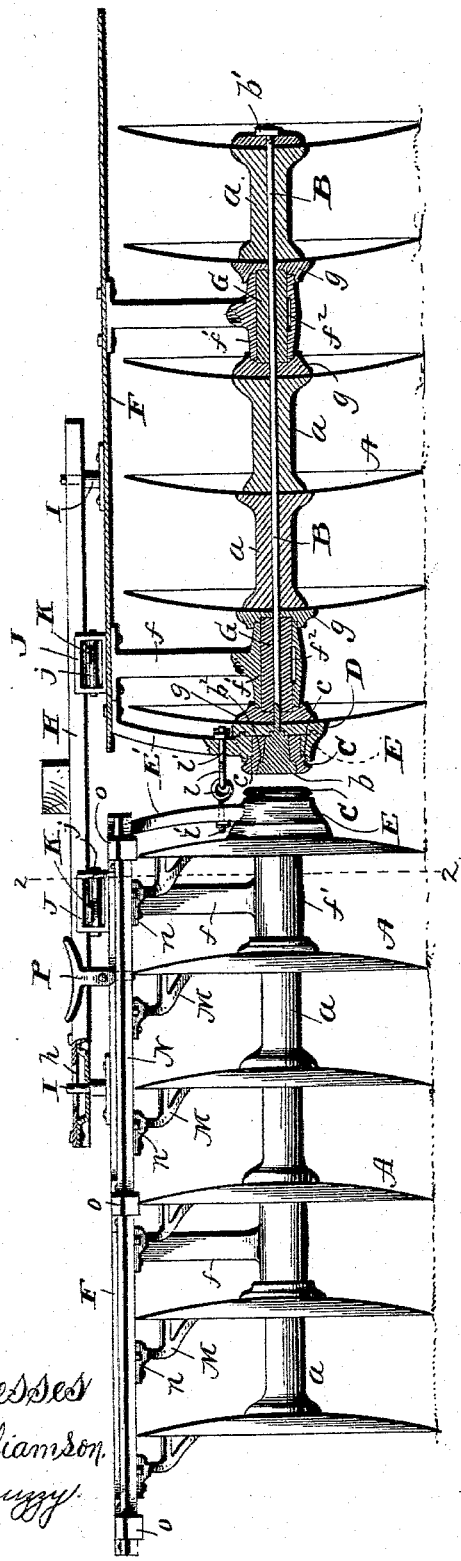
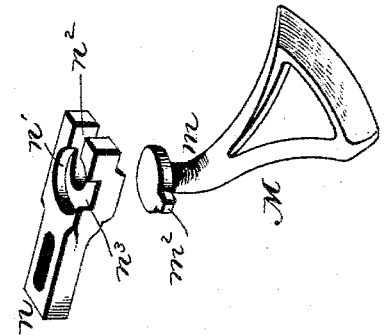
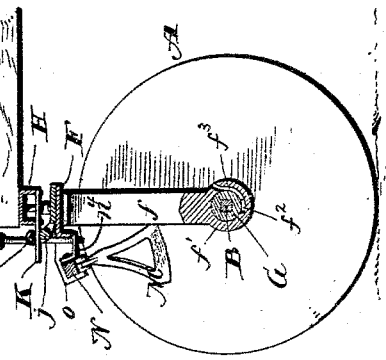
Witnesses
C. J. Williamson
E. Muzzy
Inventor
Thomas Maxon
By Alexander & Davis
Attys

UNITED STATES PATENT OFFICE.

THOMAS MAXON, OF DAYTON, OHIO.

DISK HARROW.

SPECIFICATION forming part of Letters Patent No. 494,785, dated April 4, 1893.

Application filed August 27, 1892. Serial No. 444,289. (No model.)

*To all whom it may concern:*

Be it known that I, THOMAS MAXON, a citizen of the United States, residing at Dayton, in the county of Montgomery and State of Ohio, have invented certain new and useful Improvements in Disk Harrows, of which the following is a specification, reference being had therein to the accompanying drawings.

My invention relates to a rotary disk harrow and has for its object the provision of an improved and more desirable machine.

To this end my invention consists in the harrow having its parts constructed and arranged substantially as hereinafter specified.

In the accompanying drawings Figure 1 is a rear elevation partly in section of a rotary disk-harrow embodying my improvements; Fig. 2 a section on line 2—2 of Fig. 1; Fig. 3 a detail view of my scraper.

I employ as usual two gangs of harrows, each gang comprising a number of concavo-convex disks A. mounted on a shaft or rod B and held at fixed distances apart by the usual spacing pieces $a$. At its inner end the shaft B has an enlargement or head $b$ while its outer end is threaded to receive a nut $b'$. The body of the head is conical in shape and encircling and conforming interiorly to it, is a thimble or sleeve C, whose exterior is cylindrical. Interposed between the adjacent harrow disk A and the ends of the head $b$ and thimble C is a washer D, and journaling the thimble is a bearing or boxing E formed at the lower end of the hanger E' depending from the gang beam F. The washer D has such diameter as to overlap the boxing E so that said hanger receives the inward end thrust of the harrows, while the opposite end thrust is also sustained by said hanger by the provision of an annular shoulder $c$ on the thimble C abutting against the opposite side of the boxing E. The head $b$ carries a shoulder $b^2$ which engages the thimble to hold the same in place. This flange $b^2$ is seated in a recess in the thimble end and the flange $c$ on the thimble is seated in a recess in the boxing to prevent dirt from entering between the bearing surfaces.

The function of the hanger E' is simply to take the end thrust, as described, the gang being supported by other means now to be described.

The gang beams F are preferably made from angle iron, and from each depends two hangers $f$ and $f$ at suitable distances apart to journal and support its respective gang of harrows. The lower end of each hanger is extended laterally and made hollow to form a journal box $f'$ to receive a cylindrical journaling block G through which the shaft or rod B is passed. The box $f'$ and block G take the place of a distance piece, and between their ends and the sides of the adjoining harrows A are provided disks $g$ and $g$ whose ends are recessed to receive the ends of said parts. The latter construction is to prevent dirt from working in between the bearing surfaces and as further contributory to this the block is made somewhat longer than the box so that its ends project beyond the end of the latter. In the bottom wall of the box is formed a cavity $f^2$ constituting an oil cup which is supplied by a passage $f^3$ opening to the outside of the box in its upper half.

Each gang of harrows is connected to the usual cross beam H by means of a vertical pin I that is secured to and projects upward from the upper side of each gang beam near its longitudinal center into a slot $h$ in said beam H, and a bracket or loop J secured to the upper side of each gang beam near its inner end with which a rearwardly projecting bar or rod K on the beam H engages. As the two gangs are flexibly connected at their inner ends the slot $h$ is necessary to allow movement of the pin I when the gangs are shifted from a straight line to an angle and vice versa, and the loop and bar K are provided to limit the movement of the gang in a horizontal direction by the engagement of the bar with the loop's vertical sides, and also to prevent the inner end of the gang from rising. The loop is provided with a horizontal roller $j$ on which the bar K rests to ease the travel of the latter. The two gangs are connected together by means of an eye $l$, that is provided on the hanger E', the eye of one being connected to the eye of the other. Each eye has a shank $l'$ passing through an opening in the hanger whose free end is threaded to receive a nut or pin or both, to hold the eye securely in place. The shank is made longer than the thickness of the hanger to permit an in or out movement of the eye, as the ends of the gangs have their distances apart changed by the usual change in the angles of the gangs.

To clean the harrows, I provide a scraper M to operate on the concave face of each disk. Each scraper has a triangular form and is secured to a supporting bar N by means of a bracket $n$ bolted to the under side of the latter which is engaged by the headed shank $m$ of the scraper. In its upper side, which abuts against the under side of the bar N the bracket has a circular cavity $n'$ to receive the head of the shank $m$, and to enable said head to be placed therein the bracket has an open-ended slot $n^2$ of a width less than the diameter of the cavity, through which the shank is passed until the head is in alignment with the cavity $n'$, and the head then dropped therein. Of course the scraper and bracket are thus united before the bracket is attached to the bar N. The scraper is designed to have a limited rocking movement in the bracket in order that it may adapt itself to irregularities on the surface of the disk, and such movement is limited by a lug $m^2$ on the head which moves in a recess $n^3$ in the bracket the side walls of the latter engaging and stopping the lug by hanging the scraper shank so that it stands in a radial line in rear of a line passing vertically through the center or axis of the disk, and locating its pivot shank at one of the apices of the triangle. It will be observed, the scraper is free to rock on its vertical shank and adjust itself to the irregularities of the disk. The bracket $n$ is slotted to enable it to be moved to adjust the scraper to the disk, while to bodily move all the scrapers to or from the disks, the bar N is longitudinally movable in its supporting brackets $o$ that depend from the bar F by means of a T-shaped treadle lever P that is pivoted to the bar F in convenient reach of the front of the operator. The vertical member of said lever engages a slotted or perforated plate $n^4$ attached to the bar N, while either of the horizontal members is adapted for engagement by the foot, one, when pressed operating to move the scrapers into contact with the disks, and the other acting to move them away therefrom.

Any suitable devices may be used to shift the relative position of the two gangs, but none will be described.

Having thus fully described my invention, what I claim, and desire to secure by Letters Patent, is—

1. In a disk-harrow, the combination of the tongue, cross beam and gang-beams, the gang-shafts journaled in the usual hangers carried by the gang-beam and having the axial-bolts provided with heads at their inner ends, the supplemental hangers E' rigidly depending from the inner ends of the gang-beams, a thimble C journaled in an opening in the lower end of each of the hangers and provided with an external shoulder or flange $c$ abutting against the hanger, said thimbles encircling the respective heads of the gang-bolts, as and for the purpose described.

2. In combination with a gang of harrows and a gang beam supporting and journaling the same, a hanger depending from said beam at its inner end, the thimble journaled within an opening in the hanger and engaging the inner side thereof, the revolving washer on the other side, and bearing against the outer side of the hanger and thimble and the gang shaft having a head within the thimble, substantially as described.

3. In a disk-harrow, the combination of a pair of gangs and gang-beams, depending hangers E' supporting the inner ends of the gangs, a pair of eyes $i$ interlocking with each other and provided with shanks connected to the respective hangers and horizontally adjustable thereon, substantially as described.

4. The combination of a cross-beam, the gang-beams carrying gangs of disks, vertical pivotal bolts I secured to the gang-beams and working in slots in the cross-beam two rearwardly extending bars K' rigidly secured to the cross-beam, a vertical loop J rigidly secured to the inner end of each gang-beam and embracing the rear end of one of the bars K, said loops serving to support the inner ends of the gangs and their vertical sides being adapted to abut against the side edges of the bars and limit the swing of the gang-beams, substantially as described.

5. In combination with the cross beam and the gang beams of a rotary disk harrow, the gang beams being connected at their inner ends, the pin on each gang beam engaging a slot in the cross beam, the loop at the inner end of each gang beam, the roller carried by the loop and the bar on the cross beam engaging loop and resting on roller, substantially as described.

6. In combination with a gang of harrows, and the shaft or rod thereof, the gang beam, the hanger depending therefrom and having an elongated journal box, F' embracing the shaft, and the journal block G secured on said shaft and rotating in said box, the ends of the box and block entering recesses in disks $g$ carried by the shaft, substantially as described.

7. The combination of a beam and gang of disks carried thereby, a sliding rod carrying clips $n$, and scrapers M having their upper headed ends held in said clips and having a limited pivotal movement, as and for the purpose described.

8. The combination of a gang-beam and gang clips supported by the beam and each having a recess or depression $n'$, and scrapers M each having a head on its upper end adapted to rest and rotate in one of said depressions $n'$ in the clips, and stops for limiting the pivotal movement of the scrapers, substantially as described.

9. The combination of a gang-beam, a gang of disks, a sliding rod N and means for moving it, clips $n$ secured to the under side of the rod N, said clips each having a vertical slot $n^2$ and a depression in its upper side around the slot, and a depending scraper M pivotally carried by each of said clips and provided with a shank $m$ working in the slot $n^2$ and a head resting in the depression $n'$, a stop being formed on the head to restrict the pivotal movement of the scraper.

In testimony whereof I affix my signature in presence of two witnesses.

THOMAS MAXON.

Witnesses:
JOHN L. H. FRANK,
OTTO. B. FRANK.